Dec. 6, 1966   W. C. STEINMETZ   3,289,819
SPIRAL CONVEYOR COUPLING MEANS
Filed Aug. 12, 1965

INVENTOR;
WALTER C. STEINMETZ,
BY David Young
ATTORNEY.

United States Patent Office 3,289,819
Patented Dec. 6, 1966

3,289,819
SPIRAL CONVEYOR COUPLING MEANS
Walter C. Steinmetz, Columbus, Ohio, assignor to Jeffrey Galion Manufacturing Company, a corporation of Ohio
Filed Aug. 12, 1965, Ser. No. 479,233
6 Claims. (Cl. 198—213)

This invention relates to spiral conveyors, and more particularly to an improved coupling means for connecting successive sections of spiral conveyor.

It is customary to construct spiral conveyors of successive spiral conveyor sections to make up the full length of the spiral conveyor. Such spiral conveyor sections are rotatably mounted in a trough which contains the material that is conveyed. In order to facilitate maintenance and service of the spiral conveyor, it is desired that each spiral conveyor section be removable from the conveyor assembly separately of the other spiral conveyor sections. For this purpose, there is provided a coupling device between adjacent spiral conveyor sections, which permits separation of a single spiral conveyor section and removal of the same from the conveyor assembly.

It is a prime object of the instant invention to provide an improved coupling means for adjacent spiral conveyor sections.

It is another object of the instant invention to provide an improved coupling means for adjacent spiral conveyor sections in which the spiral conveyor sections are axially aligned with each other.

It is also an object of the instant invention to provide an improved coupling means for spiral conveyor sections in which the spiral conveyor sections are secured to each other in the axial direction so as to prevent any axial separation.

It is a further object of the instant invention to provide an improved spiral conveyor coupling means, in which the elements of the coupling means are separated by sliding one element relatively to the other in a lateral direction.

It is another object of the instant invention to provide an improved coupling means for adjacent spiral conveyor sections which transmits the torque for rotation of the several spiral conveyor sections.

It is still another object of the instant invention to provide an improved spiral conveyor coupling means, in which the interengaging parts of the coupling means are covered and are not exposed to the material conveyed by the spiral conveyor.

Other objects of the instant invention will appear hereinafter, the novel features and combinations being set forth in the appended claims.

Figure 3:
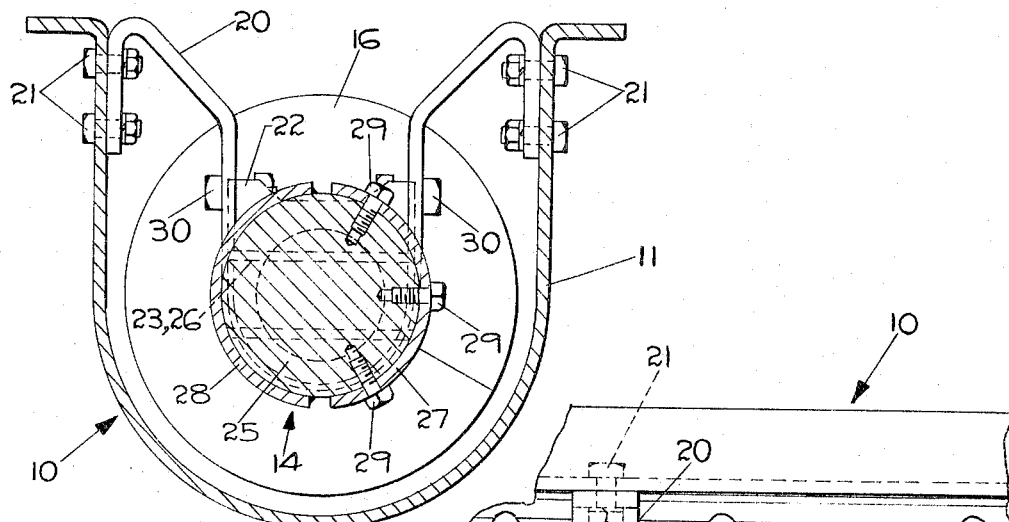
FIG. 3 is a transverse sectional view of the spiral conveyor, taken on the line 3—3 in FIG. 1.
Figure 2:
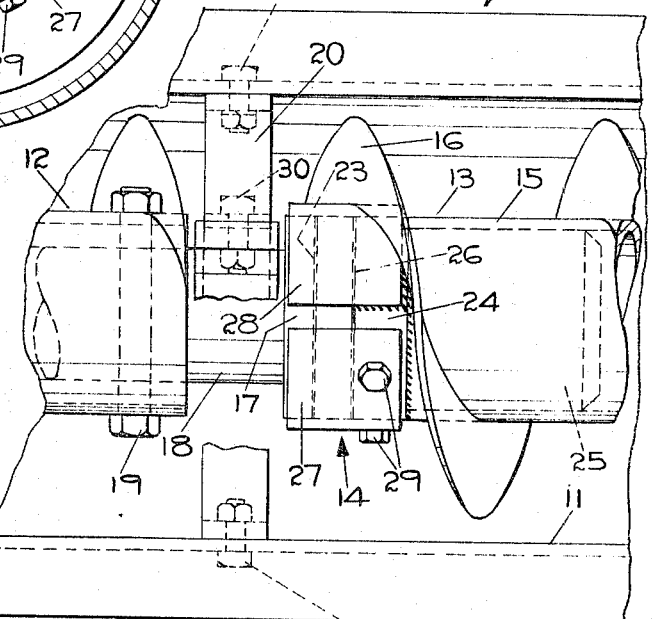
FIG. 2 is a plan view of the spiral conveyor.

Referring to the drawings, there is illustrated therein a spiral conveyor 10 having a trough 11 within which there is a first spiral conveyor section 12 and a second spiral conveyor section 13. The first and second spiral conveyor sections 12, 13 are connected to each other by coupling means 14 for rotation thereof together in the trough 11 to convey material in the axial direction. Suitable power means is customarily connected to the conveyor sections 12, 13 for rotating the latter.

The second spiral conveyor section 13 is constructed with a hollow shaft 15 and a spiral flight 16 which is wound on the periphery of the hollow shaft 15. The first spiral conveyor section 12 is similarly constructed, as seen in the drawings.

The coupling means 14 comprises a first cylindrical coupler 17 which is fromed with a short shaft 18 that extends into the first conveyor section 12 and is affixed to the latter in a suitable manner, as by one or more bolts 19.

A hanger 20 is secured to the trough 11 by a plurality of bolts 21. A bushing 22 is secured in the hanger 20 by bolts 30, and the short shaft 18 of the first cylindrical coupler 17 is received within the bushing 22 to rotatably support the first and second spiral conveyor sections 12, 13 by the hanger 20. The hanger 20 provides an intermediate support along the length of the spiral conveyor 10, and several such hangers 20 may be provided, as needed.

Figure 1:
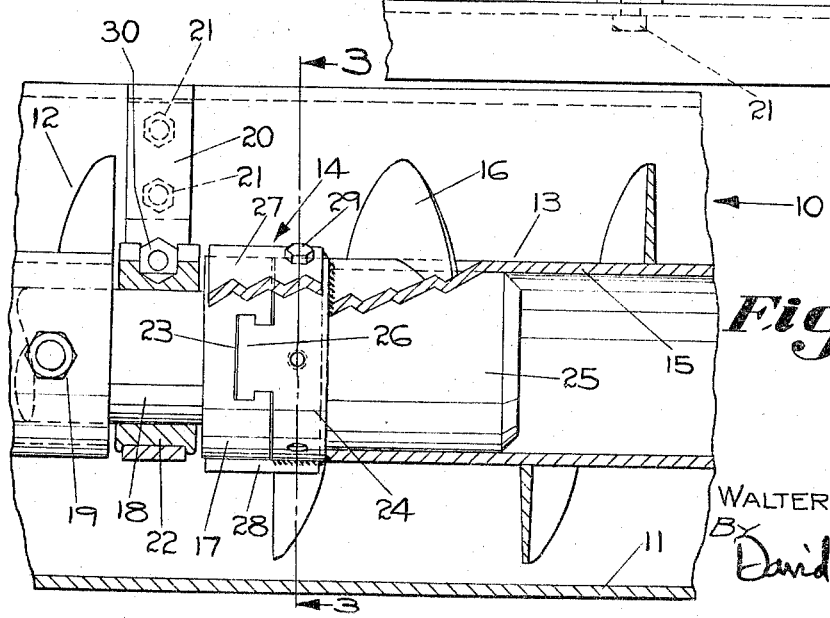
FIG. 1 is an elevational view, partially in section, of a spiral conveyor constructed in accordance with this invention.

The first coupler 17 is formed with a slot 23 which extends in the lateral direction along a diametral line from one side to the other side of the coupler 17. The opposite sides of the slot 23 are undercut to form a T cross-section, as seen in FIG. 1.

A second cylindrical coupler 24 is formed with a short shaft 25 that extends into the hollow shaft 15 and is affixed to the latter in a suitable manner, as by welding. The second cylindrical coupler 24 is formed with a tongue 26 that extends in a lateral direction along a diametral line from one side to the other side of the coupler 24 and has a T cross-section to interengage with the slot 23, and such complemental T cross-sections of the slot 23 and the tongue 26 interengage with each other to prevent any axial separation of the conveyor sections 12, 13. The first coupler 17 and the second coupler 24 are engaged with each other by lateral sliding movement of the one relatively to the other, and they are similarly disengaged.

A partial collar 27 overlies the first coupler 17, and extends in the axial direction to overlie the second coupler 24. Another partial collar 28 is affixed to the second coupler 24, as by welding, and extends in the axial direction to overlie the first coupler 17. The partial collars 27, 28 lie over the ends of the slot 23 and tongue 26. A plurality of bolts 29 extend through the partial collar 27 and are threaded into the second coupler 24 to releasably secure the first coupler 17 and the second coupler 24 to each other.

In the coupling means of this invention, when it is desired to disconnect the spiral conveyor sections 12, 13, the latter are rotated to position the partial collar 27 at the top. The bolts 29 are then removed which releases the coupling means 14. The partial collar 27 is removed. It will be understood that at the other end of a spiral conveyor section there is another coupling means 14 which is similarly released. Then both ends of the spiral conveyor section are free. Separation is accomplished by sliding one of the couplers relatively to the other, which disengages the slot and tongue 23, 26. It will be understood that the bushing 22 at one end or the other end of a given spiral conveyor section is also removed, by release of the bolts 20. The reverse procedure is followed in installing a spiral conveyor section in the spiral conveyor 10.

The coupling means of this invention permits a single spiral conveyor section to be quickly and easily removed from the spiral conveyor. One spiral conveyor section may be removed without disturbing any of the other sections of the spiral conveyor. The tongue and slot connection between the spiral conveyor sections provides a secure means for connecting the successive spiral conveyor sections, and also transmits the torque for rotating the spiral conveyor sections. The partial collars on the opposite sides of the coupler elements overlie the tongue and slot connection and cover the same so that it is not exposed to the material which is conveyed by the spiral conveyor.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a spiral conveyor, a first spiral conveyor section, a second spiral conveyor section, said first and second spiral conveyor sections being disposed in adjacent axial alignment to successively convey material, means mounting said first and second spiral conveyor sections for rotation, a first coupling element for said first spiral conveyor section, a second coupling element for said second spiral conveyor section, said first and second coupling elements including complementally formed portions to interengage one with the other for connecting said first and second spiral conveyor sections, a partial collar for said first and second coupling elements, said partial collar being affixed to one of said coupling elements, another partial collar for said first and second coupling elements, means to releasably secure said another partial collar to one of said coupling elements, said first and second spiral conveyor sections being connected to each other by interengagement of said complementally formed portions of said coupling elements to be rotatable together and being separable by removal of said releasable securing means and disengagement of said complementally formed portions of said coupling elements.

2. In a spiral conveyor, a first spiral conveyor section, a second spiral conveyor section, said first and second spiral conveyor sections being disposed in adjacent axial alignment to successively convey material, means mounting said first and second spiral conveyor sections for rotation, a first cylindrical coupler for said first spiral conveyor section, a second cylindrical coupler for said second spiral conveyor section, said first and second couplers including a tongue and slot, respectively, which interengage one with the other for connecting said first and second spiral conveyor sections, said tongue and slot extending laterally of said first and second spiral conveyor sections, a partial collar for said first and second couplers, said partial collar being affixed to one of said couplers, another partial collar for said first and second couplers, means to releasably secure said another partial collar to one of said couplers, said first and second spiral conveyor sections being connected to each other by interengagement of said tongue and slot of said couplers to be rotatable together and being separable by removal of said releasable securing means and disengagement of said tongue and slot of said couplers.

3. In a spiral conveyor as recited in claim 2 in which said tongue and slot of said first and second couplers extend along a diametral line and are engageable one with the other by sliding movement of one relatively to the other along said diametral line.

4. In a spiral conveyor, a first spiral conveyor section, a second spiral conveyor section, said first and second spiral conveyor sections being disposed in adjacent axial alignment to successively convey material, means mounting said first and second spiral conveyor sections for rotation, a first cylindrical coupler for said first spiral conveyor section, a second cylindrical coupler for said second spiral conveyor section, said first and second cylindrical couplers including interengaging tongue and slot means for connecting said first and second spiral conveyor sections, said tongue and slot means extending laterally of said first and second spiral conveyor sections, a partial collar for said first and second couplers, said partial collar being affixed to one of said couplers at one side of said couplers, another partial collar for said first and second couplers, means to releasably secure said another partial collar to one of said couplers at the opposite side of said couplers, said first and second spiral conveyor sections being connected to each other by interengagement of said tongue and slot means of said couplers to be rotatable together and being separable by removal of said releasable securing means and disengagement of said tongue and slot means of said couplers.

5. In a spiral conveyor as recited in claim 4 in which said tongue and slot means comprises a slot extending along a diametral line, a tongue extending along a diametral line, the opposite sides of said slot being undercut, and said tongue being formed with a T cross-section to interengage with said slot.

6. In a spiral conveyor, a first spiral conveyor section, a second spiral conveyor section, said first and second spiral conveyor sections being disposed in adjacent axial alignment to successively convey material, means mounting said first and second spiral conveyor sections for rotation, a first cylindrical coupler for said first spiral conveyor section, a second cylindrical coupler for said second spiral conveyor section, said first and second cylindrical couplers including a tongue and slot, respectively, which interengage one with the other for connecting said first and second spiral conveyor sections, said tongue and slot extending through said first and second cylindrical couplers in the lateral direction from one side to the other side thereof, a first partial collar and a second partial collar for said first and second couplers, said first and second collars being disposed on opposite sides of said first and second couplers and overlying said tongue and slot, said first collar being affixed to said first coupler and extending in the axial direction to overlie said second coupler, said second collar extending in the axial direction to overlie said first and second couplers, means to releasably secure said second collar to said first coupler, said releasable securing means extending through said second collar and engaging said first coupler, said first and second spiral conveyor sections being connected to each other by interengagement of said tongue and slot of said couplers to be rotatable together and being separable by removal of said releasable securing means and disengagement of said tongue and slot of said couplers.

References Cited by the Examiner

UNITED STATES PATENTS

| 2,528,679 | 11/1950 | Ballard | 198—213 |
| 2,630,341 | 3/1953 | Downey | 198—213 |

EVON C. BLUNK, *Primary Examiner.*

R. E. AEGERTER, *Assistant Examiner.*